(12) United States Patent
Takeda et al.

(10) Patent No.: US 7,591,104 B2
(45) Date of Patent: Sep. 22, 2009

(54) MOUNTING STRUCTURE OF A POWER WINDOW APPARATUS

(75) Inventors: Akihiro Takeda, Yokohama (JP); Yasuo Ohtsuki, Yokohama (JP); Kazuyuki Sasaki, Yokohama (JP)

(73) Assignee: Ohi Seisakusho Co., Ltd. (JP)

( * ) Notice: Subject to any disclaimer, the term of this patent is extended or adjusted under 35 U.S.C. 154(b) by 360 days.

(21) Appl. No.: 10/896,787

(22) Filed: Jul. 21, 2004

(65) Prior Publication Data
US 2005/0016071 A1    Jan. 27, 2005

(30) Foreign Application Priority Data
Jul. 23, 2003  (JP) ............... P2003-200731
Jul. 23, 2003  (JP) ............... P2003-200732

(51) Int. Cl.
E05F 11/48 (2006.01)
(52) U.S. Cl. ..................................... 49/352
(58) Field of Classification Search ............ 49/502, 49/348, 349, 352
See application file for complete search history.

(56) References Cited

U.S. PATENT DOCUMENTS

| | | | | |
|---|---|---|---|---|
| 4,970,911 A | * | 11/1990 | Ujihara et al. | 74/501.5 R |
| 5,890,321 A | * | 4/1999 | Staser et al. | 49/502 |
| 6,427,386 B1 | * | 8/2002 | Kalb et al. | 49/349 |
| 6,449,907 B2 | * | 9/2002 | Nishikawa et al. | 49/502 |
| 6,634,142 B2 | * | 10/2003 | Dobson et al. | 49/352 |
| 6,857,688 B2 | * | 2/2005 | Morrison et al. | 296/146.7 |
| 7,044,412 B2 | * | 5/2006 | Hemond et al. | 242/390.8 |
| 7,104,009 B2 | | 9/2006 | Ishii et al. | |
| 7,234,274 B2 | | 6/2007 | Ishii et al. | |
| 7,263,804 B2 | | 9/2007 | Ishii et al. | |

FOREIGN PATENT DOCUMENTS

JP    06173529 A   *  6/1994
JP    2001-199236     7/2001

\* cited by examiner

Primary Examiner—Jerry Redman
(74) Attorney, Agent, or Firm—Kilpatrick Stockton LLP

(57) ABSTRACT

A drive unit is arranged in a side of one side surface of a panel constituting a part of a door, and a drum case of a driven unit is fixed to a side of another side surface of the panel. The side of another side surface of the panel is provided with a plurality of engagement portions, which are engaged respectively with a plurality of to be engaged portions provided in the drum case, thereby positioning the drum case.

5 Claims, 9 Drawing Sheets

MOUNTING STRUCTURE OF A POWER WINDOW APPARATUS

CROSS REFERENCE TO RELATED APPLICATIONS

This application is based upon and claims the benefit of priority from Japanese Patent Applications No. P2003-200731, filed on Jul. 23, 2003, and P2003-200732, filed on Jul. 23, 2003 in the Japanese Patent Office; the entire contents of which are incorporated herein by reference.

BACKGROUND OF THE INVENTION

1. Field of the Invention

The present invention relates to a power window apparatus and a mounting structure of the same.

2. Description of the Related Art

A power window apparatus for elevating a window panel (pane) in a vehicle is schematically constituted by an inner panel which is arranged in an inner side of the vehicle, and an elevating apparatus which is provided in the vehicle body side of the inner panel and elevates the window panel.

Conventionally, in the case of mounting the power window apparatus mentioned above, a drive unit constituted by a drum case receiving a motor, a speed reduction mechanism and the like is arranged in one side surface (a surface in a vehicle inner side) of a synthetic resin inner panel arranged in a vehicle inner side of an automotive door, and a driven unit constituted by a drum case receiving a drum around which a cable connected to a window panel (a window glass) is wound so as to be freely taken up and delivered is arranged in another side surface (a surface in a vehicle outer side) of the inner panel. In this case, a gear case of the drive unit and the drum case of the driven unit are fixed to the inner panel by a plurality of bolts (for example, refer to Japanese Patent Application No. 2001-199236).

However, in the structure mentioned above, a hole diameter of a mounting hole to which a bolt is inserted is set larger than a diameter of a thread portion of the bolt, with taking a heat shrinkage of the synthetic resin or the like into consideration. Accordingly, it is troublesome to position the drum case with respect to the inner panel. Further, a fastening force is lowered due to an influence of the heat shrinkage or the like of the drum case after the drum case is fastened to the inner panel by the bolts, whereby it becomes unstable to hold the drum case to the inner panel, so that there is a risk that a deterioration in quality of the power window apparatus is caused.

Further, in the conventional structure, since the drum case in the driven unit is normally fixed to the inner panel by three bolts in a periphery of a portion receiving a rotating drum, a portion near the cable insertion portion provided in the drum case is not fixed to the inner panel. Accordingly, in particular, in the case that a great load is applied to the cable insertion portion such as the case that the cable is entangled in the rotating drum, or the like, there is a risk that the cable insertion portion is deformed.

Taking the problem in the conventional structure mentioned above into consideration, a first object of the present invention is to provide a power window apparatus structured such that a drum case can be positioned with respect to a panel, and the drum case can be held in the panel without being displaced.

Further, a second object of the present invention is to provide a power window apparatus which can prevent a cable insertion portion of the drum case fixed to the panel from being deformed.

SUMMARY OF THE INVENTION

In order to achieve the object mentioned above, a power window apparatus in accordance with the present invention is comprised of a drive unit and a driven unit connected to the drive unit has a rotating drum around which a cable connected to a window panel is wound so as to be wound up and delivered and a synthetic resin drum case which receives the rotating drum, wherein the drive unit is arranged in a side of one side surface of a panel constituting a part of a door, and the drum case is fixed to a side of another side surface of the panel, and wherein at least one engagement portion is provided in the side of another side surface of the panel, and the engagement portion is engaged with at least one to be engaged portion provided in the drum case, thereby making it possible to position the drum case.

BRIEF DESCRIPTION OF THE DRAWINGS

FIGS. 8A and 8B are enlarged horizontal cross sectional views along a line VIII-VIII in FIG. 5, in which FIG. 8A shows a state before being fastened, and FIG. 8B shows a state after being fastened;

DETAILED DESCRIPTION OF THE INVENTION

Figure 2:
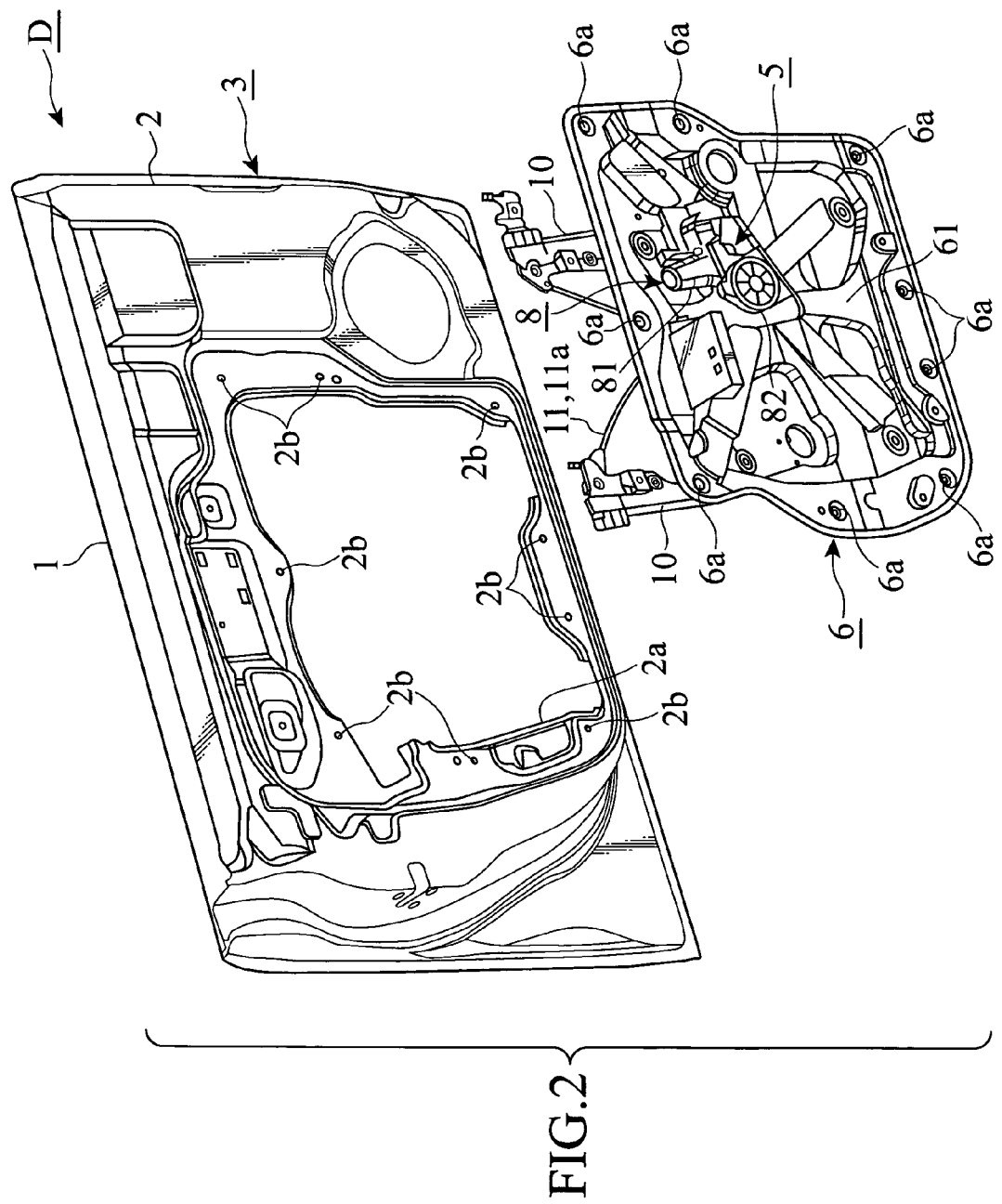
FIG. 2 is an exploded perspective view of the door shown in FIG. 1.
Figure 3:
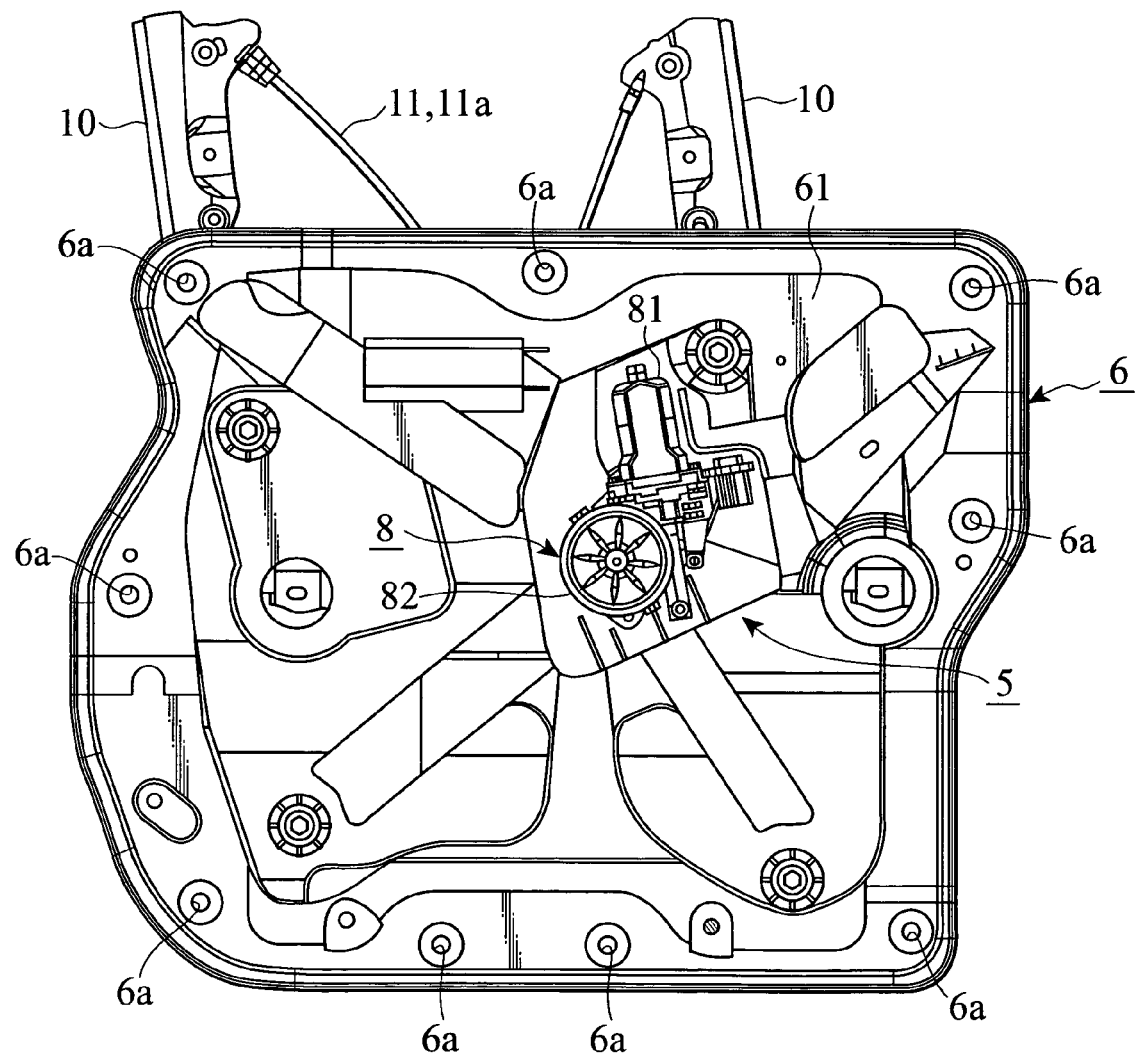
FIG. 3 is a side elevational view of a module base as seen from a vehicle inner side.

A description will be given below of an embodiment in accordance with the present invention with reference to the accompanying drawings. In this case, in the following description, right side in FIGS. 1 to 3 is set to "front side", left side is set to "rear side", near side of paper surface is set to "vehicle inner side", and far side of paper surface is set to "vehicle outer side".

Figure 1:
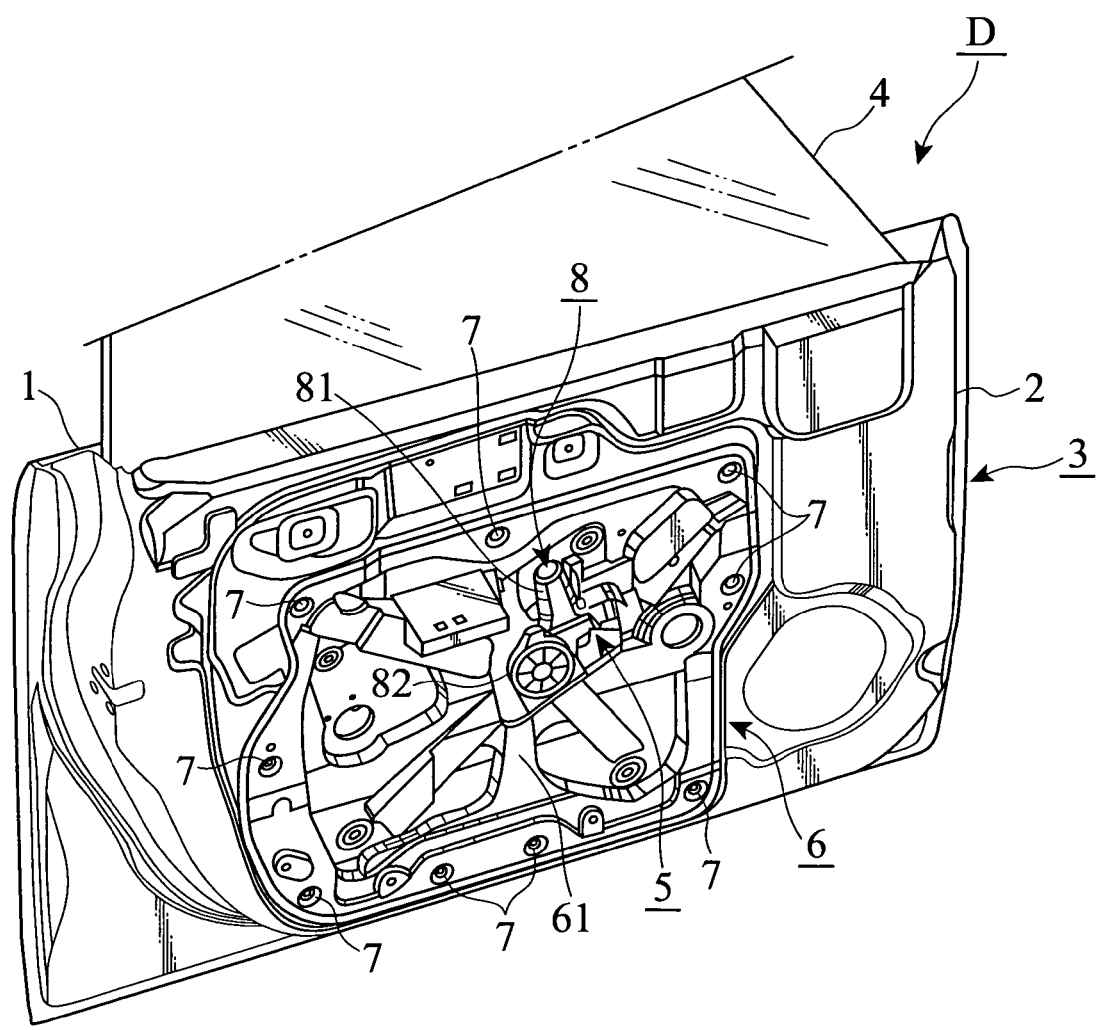
FIG. 1 is a perspective view of a door to which the present invention is applied.

A door D shown in FIG. 1 is an automotive front door in which a front end portion is pivoted to a vehicle body (not shown) openably and closably by a pair of upper and lower door hinges (not shown). A door main body 3 and a module base 6 are assembled in the door D. The door main body 3 is formed in a box shape by hemming and spot welding peripheral edges of an outer panel 1 and an inner panel 2 except upper edges thereof. The outer panel structures the vehicle outer side and is made of a steel plate. The inner panel structures the vehicle inner side, is provided with an opening 2a (shown in FIG. 2) in a center and is made of a steel plate. The module base 6 has a power window apparatus 5 for elevating a window panel (a window glass) 4 via a cable 11 mentioned below previously assembled in the vehicle inner side of the inner panel 2, structures a part of the inner panel 2 and is made of a synthetic resin.

Figure 4:
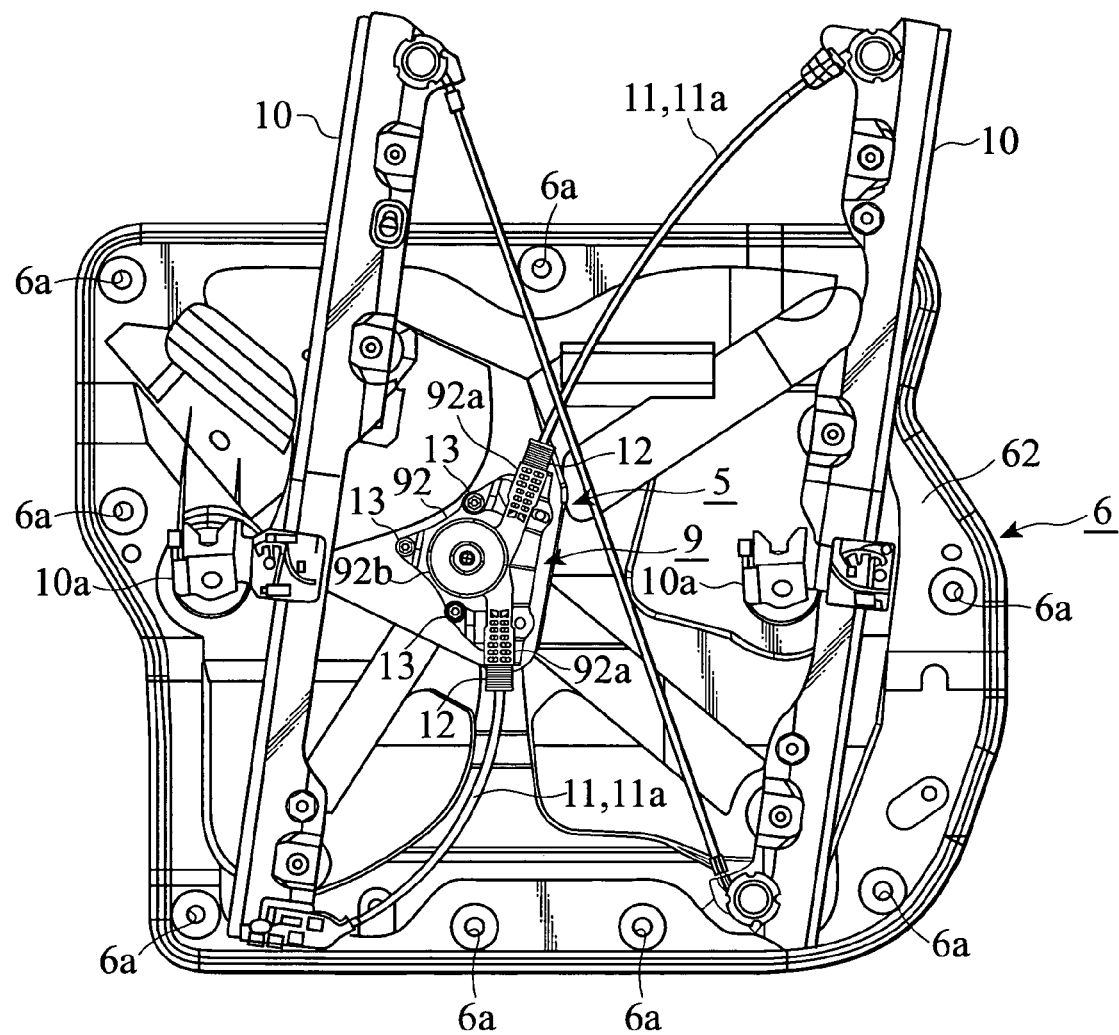
FIG. 4 is a side elevational view of the module base as seen from a vehicle outer side.

As shown in FIG. 4, a pair of front and rear guide rails 10 and 10 directed in a vertical direction so as to extend along an elevating locus of the window panel 4 are fixed to front and rear portions in another side surface 62 directed to the vehicle outer side (a side opposing to the outer panel 1) of the module base 6. A lower portion of the window panel 4 is connected to carrier plates 10a and 10a fitted to the guide rails 10 and 10 so as to be slidable in a vertical direction, after assembling the module base 6 in the inner panel 2.

The cable 11 is slidably inserted into a flexible outer tube 11a connecting upper and lower end portions of the front and rear guide rails 10 and 10 to cable insertion portions 92a and 92a of a drum case 92 in a driven unit 9 mentioned below, and is arranged along the guide rails 10 and 10 so as to be connected to the carrier plates 10a and 10a.

Figure 5:
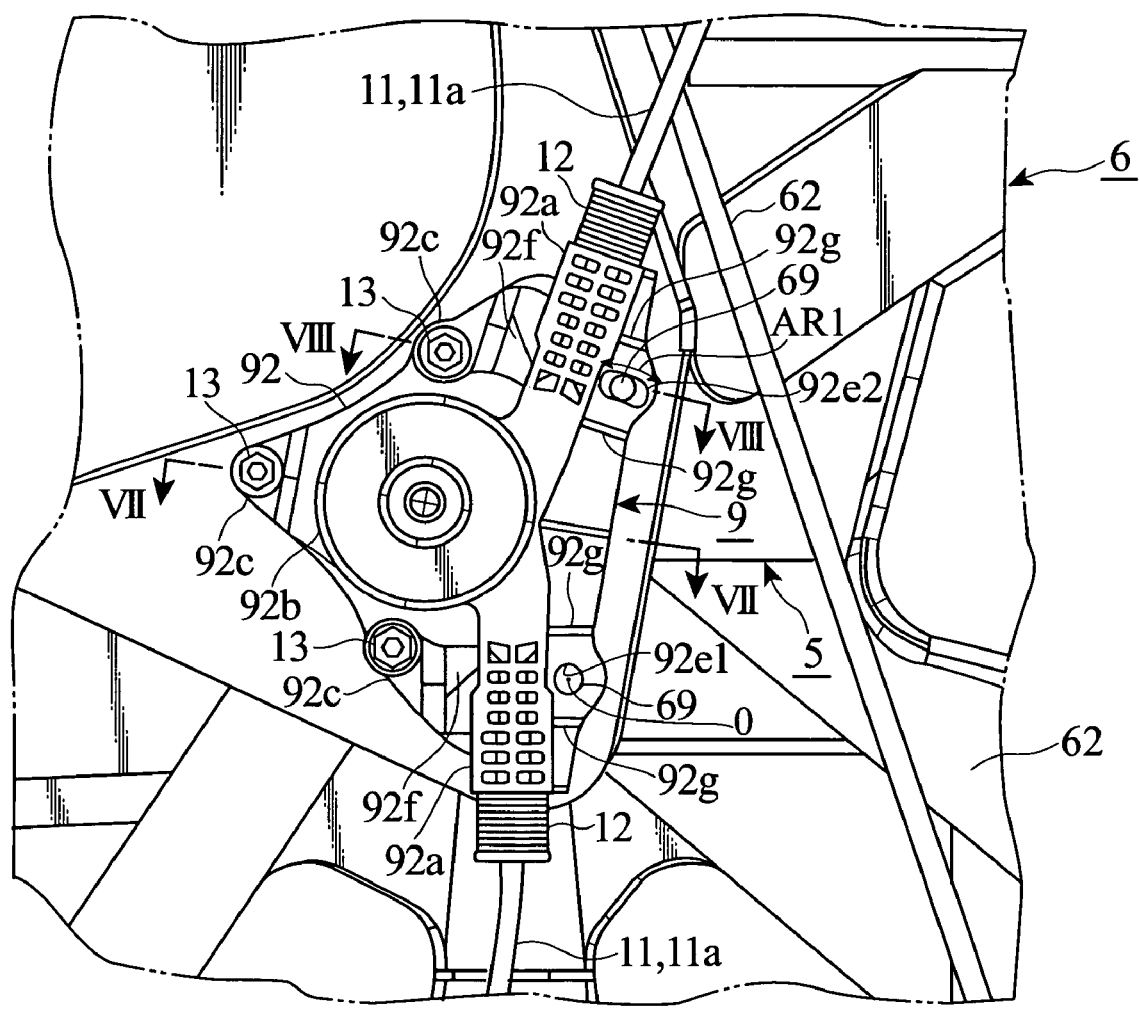
FIG. 5 is an enlarged side elevational view of a main portion in the case that the module base is seen from the vehicle outer side.
Figure 6:
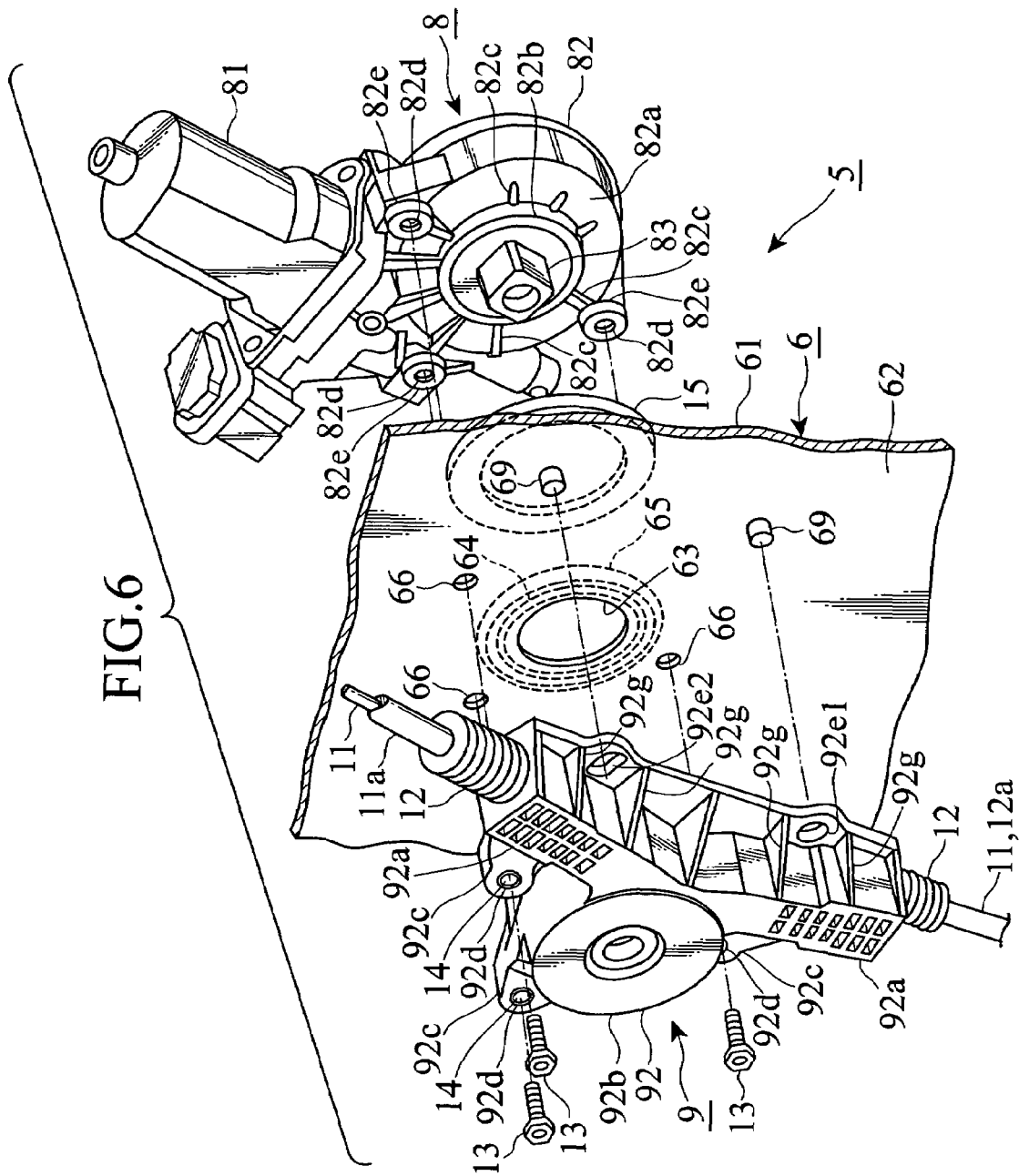
FIG. 6 is an exploded perspective view of a main portion in the case of being seen from the vehicle outer side.

With reference to FIGS. 5 and 6, end portions of the outer tubes 11a and 11a are fitted to the cable insertion portions 92a and 92a so as to be slidable at a predetermined distance along a delivering direction of the cables 11 and 11, by a known cable slack absorbing means constituted by compression springs 12 and 12.

The module base 6 is fixed to the inner panel 2 so as to close the opening 2a, by inserting a bolt 7 (refer to FIG. 1) to each of a plurality of mounting holes 6a (refer to FIG. 2) provided near an outer periphery, and screwing the bolt 7 with a female thread portion 2b provided in the periphery of the opening 2a in the inner panel 2 so as to fasten.

The power window apparatus 5 is constituted by a drive unit 8 which is arranged in one side surface 61 directed to the vehicle inner side of the module base 6, and a driven unit 9 which is arranged in another side surface 62 of the module base 6.

Figure 7:
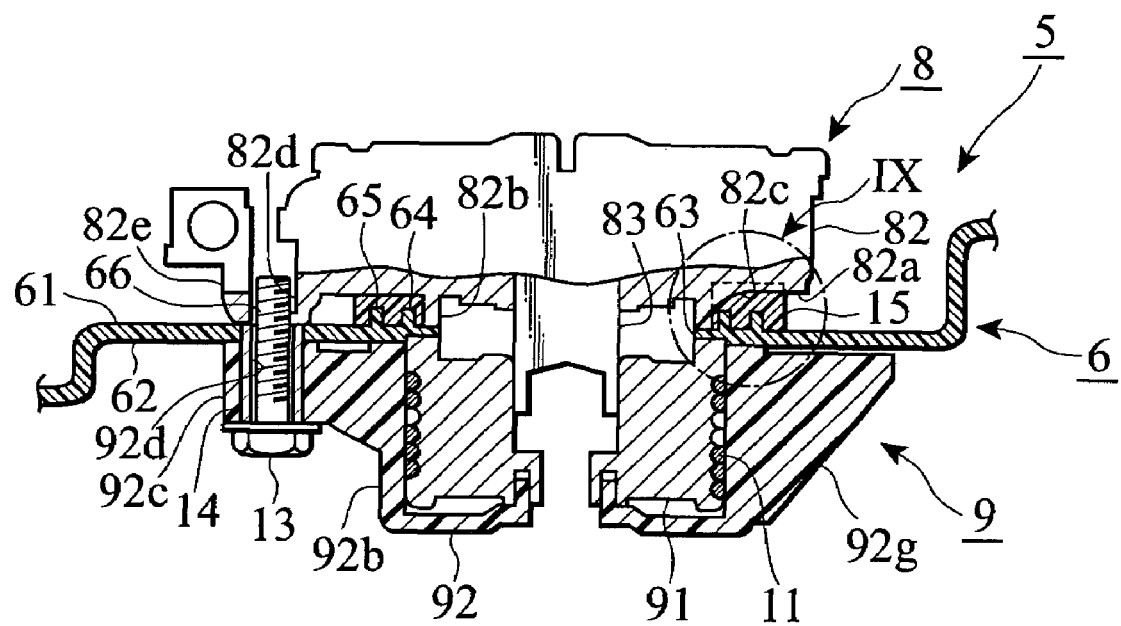
FIG. 7 is a horizontal cross sectional view along a line VII-VII in FIG. 5.

With reference to FIGS. 6 and 7, a circular communication hole 63 for connecting the drive unit 8 to the driven unit 9 is provided in a center portion in the module base 6, that is, a mounting portion to which the drive unit 8 and the driven unit 9 of the power window apparatus 5 are arranged.

Figure 10:
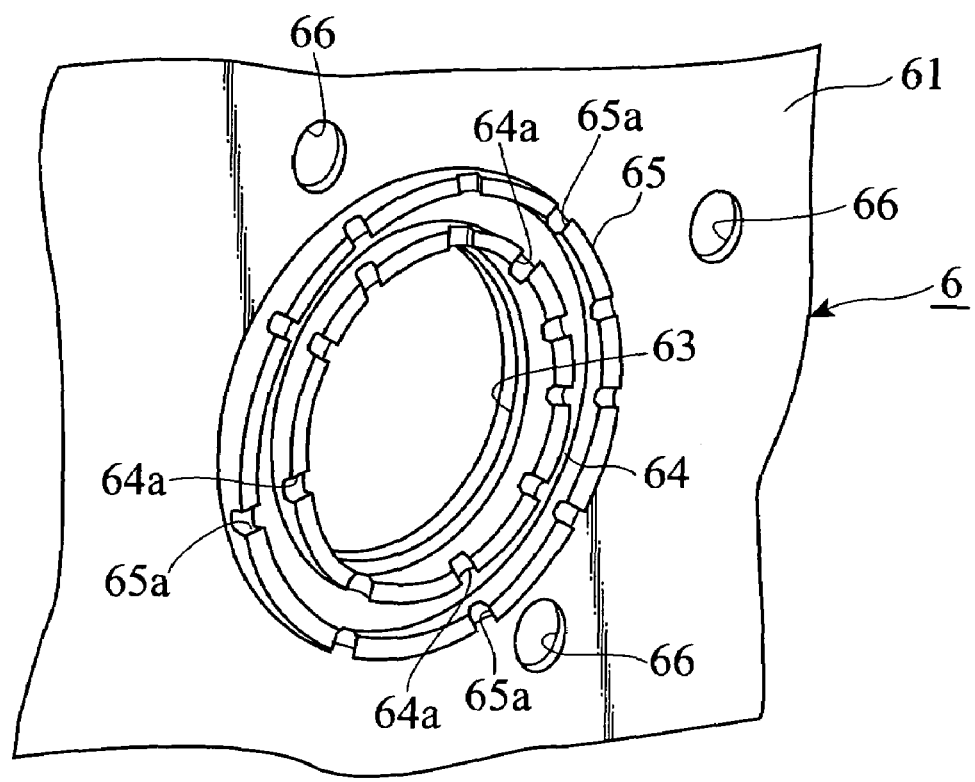
FIG. 10 is an enlarged perspective view of a main portion in the case that the module base is seen from the vehicle inner side.

With reference to FIGS. 7 and 10, an inner annular protruding portion 64 protruding toward the vehicle inner side and an outer annular protruding portion 65 having a larger diameter than the inner annular protruding portion 64 are provided in the periphery of the communication hole 63 in a side of one side surface 61 in the module base 6, for the purpose of improving a rigidity around the communication hole 63. In other words, the annular protruding portions 64, 65 are provided in the inner and outer sides in the periphery of the communication hole 63 in the module base 6 in a multiple manner.

A plurality of notch-shaped clearance portions 64a and 65a are radially provided in protruding ends of the inner and outer annular protruding portions 64 and 65 from centers of the annular protruding portions 64 and 65. The clearance portions 64a and 65a are provided at a position in correspondence to a plurality of protruding portions 82c (refer to FIG. 6) which is provided in a side of an opposing surface 82a of a gear case 82 mentioned below.

In this case, it is desirable that the clearance portions 64a and 65a have the same angle of incline as that of the protruding portions 82c, and are formed at a fixed interval.

Three mounting holes 66 through which a bolt 13 for fixing the gear case 82 mentioned below and the drum case 92 to the module base 6 is inserted are provided in the periphery of the outer annular protruding portion 65. Upper and lower protruding portions 69 and 69 which protrude to a vehicle outer side as shown in FIG. 6 and form engagement portions engageable with upper and lower through holes 92e and 92e forming to be engaged portions of the drum case 92 mentioned below are provided in a side of another side surface 62 of the module base 6 in a rear side of two mounting holes 66 and 66 which is provided in upper and lower sides of the outer annular protruding portion 65 in three mounting holes 66.

In this case, in contradiction to the structure mentioned above, in the case that the drum case 92 is provided with the engagement portion (the protruding portion), and the to be engaged portion (the through hole) engageable with the engagement portion is provided, the same holding force as the present embodiment can be achieved. However, in the case that the protruding portion is provided in the side of the module base 6 and the through hole is provided in the side of the drum case 92, there is an advantage that the position of the protruding portion can be checked out from the engagement hole at a time of assembling.

In this case, the annular protruding portion provided in the side of one side surface 61 of the module base 6 may be provided in any one of the inner and outer annular protruding portions 64 and 65, or three of more annular protruding portions may be provided. Further, the annular protruding portions 64 and 65 may be formed in an annular shape by combining a plurality of circular arc protruding portions. Further, the module base 6 may be made of the other materials than the synthetic resin, for example, made of metal, and may be integrally formed with the inner panel 2.

The drive unit 8 has a motor 81 which can be forward and backward rotated by a controller (not shown), and the metal gear case 82 to which the motor 81 is mounted, and which receives a speed reduction mechanism (not shown) being capable of reducing a rotational speed of the motor 81 and is fixed to the side of one side surface 61 of the module base 6 by the bolt 13.

As shown in FIG. 6, a rectangular columnar output shaft 83 forming a part of the speed reduction mechanism protrudes from a center of the opposing surface 82a opposing to the side of one side surface 61 of the module base 6 in the gear case 82. The output shaft 83 protrudes to the side of another side surface 62 of the module base 6 through the communication hole 63 of the module base 6.

In the side of the opposing surface 82a of the gear case 82, in order to improve a rigidity of the gear case 82, there are provided an annular protruding portion 82b arranged around the output shaft 83, a plurality of protruding portions 82c extending in a centrifugal direction from an outer periphery of the annular protruding portion 82b, and three fixing portions 82e forming three female thread portions 82d (a female thread means) in correspondence to the mounting hole 66 of the module base 6.

An outer diameter of the annular protruding portion 82b in the gear case 82 is formed smaller than an inner diameter of the annular protruding portion 64 in an inner side of the module base 6, and a protruding amount thereof is set slightly larger than a protruding amount of the inner and outer annular protruding portions 64 and 65 of the module base 6. Accordingly, in a state of fixing the gear case 82 to the side of one side surface 61 of the module base 6, the protruding end of the annular protruding portion 82b is brought into contact with a periphery of the communication hole 63 in the side of one side surface 61 of the module base 6, an approximately uniform interval is formed between the protruding ends of the inner and outer annular protruding portions 64 and 65 and the opposing surface 82a, and between the clearance portions 64a and 65a and the protruding portion 82c, as mainly shown in FIGS. 7 and 9. In this case, a plurality of protruding portions 82c are opposed to a plurality of clearance portions 64a and 65a.

In order to prevent water, such as rain water, intruding from an upper end of the door main body 3 from making an intrusion into the side of another side surface 62, that is, an indoor side from the side of one side surface 61 of the module base 6, an annular seal member 15 made from an elastic material such as an elastically deformable soft rubber, a foamed material or the like is provided between a region including the annular protruding portions 64 and 65 in the periphery of the communication hole 63 in the side of one side surface 61 of the module base 6 and a periphery of the annular protruding portion 82b including the protruding portion 82c in the opposing surface 82a of the gear case 82.

Figure 9:
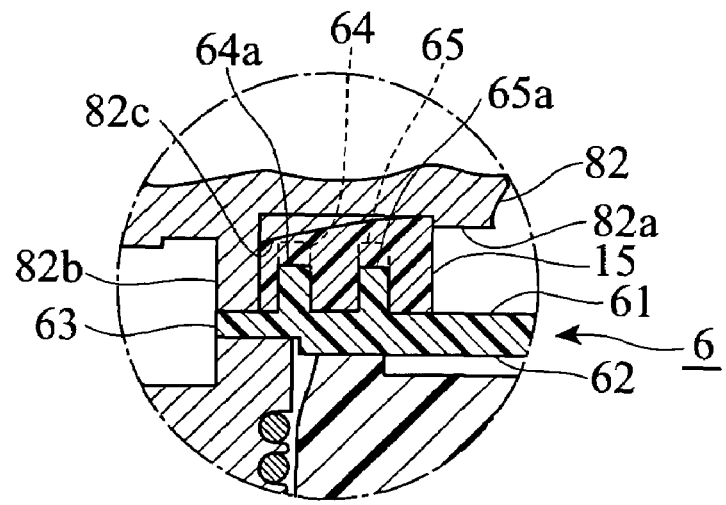
FIG. 9 is an enlarged view of a portion IX in FIG. 7.

As shown in FIGS. 7 and 9, the seal member 15 is closely contacted with the portion between the protruding ends of the inner and outer annular protruding portions 64 and 65 in the side of one side surface 61 of the module base 6 and the opposing surface 82a of the gear case 82, and the portion between the clearance portions 64a and 65a and the protruding portion 82c, and is closely contacted with the portion between the outer periphery of the annular protruding portion 82b and the inner annular protruding portion 64, and the portion between the inner annular protruding portion 64 and the outer annular protruding portion 65 so as to eat thereinto.

In this case, the seal member 15 can obtain a significant shield effect only by being superposed on at least one of the inner and outer annular protruding portions 64 and 65.

Accordingly, even in the case that the opposing surface 82a of the gear case 82 is formed in an irregular shape provided with the protruding portions 82c, it is possible to closely contact the seal member 15 with the portion between the periphery of the communication hole 63 in the side of one side surface 61 of the module base 6 and the opposing surface of the gear case 82, with an approximately uniform surface pressure. In addition, it is possible to obtain a secure shield effect, and it is possible to securely prevent the rainwater or the like from being inserted inside the motor 81 of the drive unit 8.

In this case, in the present embodiment mentioned above, the description is given of the structure in which a plurality of protruding portions 82c for improving the rigidity are provided in the side of the opposing surface 82a of the gear case 82, and the clearance portions 64a and 65a in correspondence to the protruding portion 82c are provided in the inner and outer annular protruding portions 64 and 65 of the module base 6. However, in place thereof, the structure may be made such that the protruding portion 82c is not provided in the side of the opposing surface 82a of the gear case 82. That is, the opposing surface 82a may has a flat shape. In this case, it is not necessary that the clearance portions 64a and 65a are provided in the inner and outer annular protruding portions 64 and 65. In this structure, the seal member 15 is closely contacted with the portion between the inner and outer annular protruding portions 64 and 65 and the opposing surface 82a of the gear case 82, whereby a secure shield effect can be obtained.

The driven unit 9 has the synthetic resin drum case 92 which is fixed to the side of another side surface 62 of the module base 6 by the bolt 13, and a rotating drum 91 (shown in FIG. 7) which is rotatably received in the drum case 92, and around which the cable 11 connected to the window panel 4 via the carrier plates 10a and 10a is wound so as to be wound up and delivered. The rotating drum 91 is connected to the output shaft 83 in the side of the drive unit 8 protruding from the communication hole 63 of the module base 6, thereby integrally rotating with the output shaft 83.

When rotating the rotating drum 91 in a predetermined direction on the basis of the rotation of the motor 81 of the drive unit 8, the cable 11 is wound up around the rotating drum 91, whereby the window panel 4 is moved upward along the guide rails 10 and 10.

The drum case 92 has a closed-end tubular drum receiving portion 92b which rotatably receives the rotating drum 91, and a pair of upper and lower tubular cable insertion portions 92a and 92a which is continuously provided in a rear side (a side portion) of the drum receiving portion 92b, and through which the cable 11 is inserted so as to freely move in a vertical direction. The cable insertion portions 92a and 92a have a predetermined length in a vertical direction corresponding to a moving direction of the cable 11.

Further, in the periphery of the drum receiving portion 92b in the drum case 92, there are provided three fixing portions 92c in which the mounting hole 66 in the module base 6 and a mounting hole 92d corresponding to each of the female thread portion 82d of the gear case 82 are pierced. Further, the cable insertion portion 92a (the rear side (the side portion) of the cable insertion portion 92a) is provided with upper and lower engage holes 92e₁ (a hole) and 92e₂ (an elongate hole) which forms to be engaged portions (or engaged means) with the upper and lower protruding portions 69 and 69 which forms the engagement portion (or the engagement means) of the module base 6. The mounting hole 92d provided in an upper side of the drum receiving portion 92b in three mounting holes 92d is positioned in a front side (in one side portion) near the upper cable insertion portion 92a, and the mounting hole 92d provided in a lower side of the drum receiving portion 92d is positioned in a front side (in one side portion) near the lower cable insertion portion 92a in the same manner.

The hole 92e₁ is tightly fitted to the lower protruding portion 69 of the module base 6 so as to be prevented from being rattled along another side surface 62 of the module base 6, and the elongate hole 92e₂ is loosely fitted to the upper protruding portion 69.

Accordingly, even in the case that an error is generated in a dimensional accuracy between the upper and lower holes 92e₁ and 92e₂ or a dimensional accuracy between the upper and lower protruding portions 69 and 69, it is possible to easily fit the upper and lower holes 92e₁ and 92e₂ to the protruding portions 69 and 69.

In other words, while assembling the module base 6 with the drum case 92, first of all, the lower protruding portion 69 is engaged with the hole 92e₁. In this state, it is possible to swing the drum case 92 round a point O of FIG. 5. Since the elongate hole 92e₂ is made elongated in swing direction (shown in an arrow AR1) of the drum case 92, it is easily possible to engage the elongate hole 92e₂ with the upper protruding portion 69 by swinging the drum case 92.

Further, since a plurality of (two in the present embodiment) holes 92e₁, 92e₂ and the protruding portions 69, 69 are fitted to each other, even when the fastening force of the bolt 13 for fixing the drum case 92 to the side of another side surface 62 of the module base 6 is lowered due to an influence of a heat shrinkage of the synthetic resin module base 6 or drum case 92 or the like, it is possible to prevent the drum case 92 from being displaced in a direction of extending along another side surface 62 of the module base 6, and it is possible to fix the drum case 92 to the module base 6 in a stable state.

In the case of assembling the drum case 92 in the module base 6, it is possible to easily and securely position the drum case 92 with respect to the module base 6 by fitting the holes $92e_1$ and $92e_2$ of the drum case 92 to the protruding portions 69 and 69 of the module base 6.

Further, in the present embodiment, since the holes $92e_1$ and $92e_2$ are provided in the drum case 92, the positions of the protruding portions 69 and 69 are visible from the holes $92e_1$ and $92e_2$ at a time of positioning the drum case 92 with respect to the module base 6. Accordingly, it is possible to easily and securely fit the holes $92e_1$ and $92e_2$ to the protruding portions 69 and 69, and it is possible to intend to improve a working efficiency.

Further, since the hole $92e_1$ ($92e_2$) is fitted to the protruding portion 69 near the cable insertion portion 92a after fixing the drum case 92 to the module base 6, it is possible to receive the load applied to the cable insertion portion 92a by the fitted portion between the hole $92e_1$ ($92e_2$) and the protruding portion 69. Accordingly, it is possible to prevent the cable insertion portion 92a from being deformed.

In this case, the protruding portion 69 forming the engagement portion (or the engagement means) and the hole $92e_1$ ($92e_2$) forming the to be engaged portion (the to be engaged means) are not limited to the structures mentioned above. For example, in place of the structure mentioned above, the structure may be made such that the protruding portion forming the engagement portion (or the engagement means) is provided in the side of the drum case 92, and the hole or the recess portion forming the to be engaged portion (or the to be engaged means) capable of being fitted to the protruding portion is provided in the side of the module base 6. Further, the structure may be made such that the module base 6 is provided with one protruding portion and one hole, and the drum case 92 is provided with one hole and one protruding portion capable of being fitted to the protruding portion and the hole of the module base 6 respectively. Further, the structure may be made such that the engagement portion (or the engagement means) is constituted by the hole and the engaged portion (or the engaged means) is constituted by the protruding portion, and the structure may be made such that the engagement portion (or the engagement means) and the engaged portion (or the engaged means) are provided in the other positions and the number of them is set to be equal to or three or more.

Figure 8A:
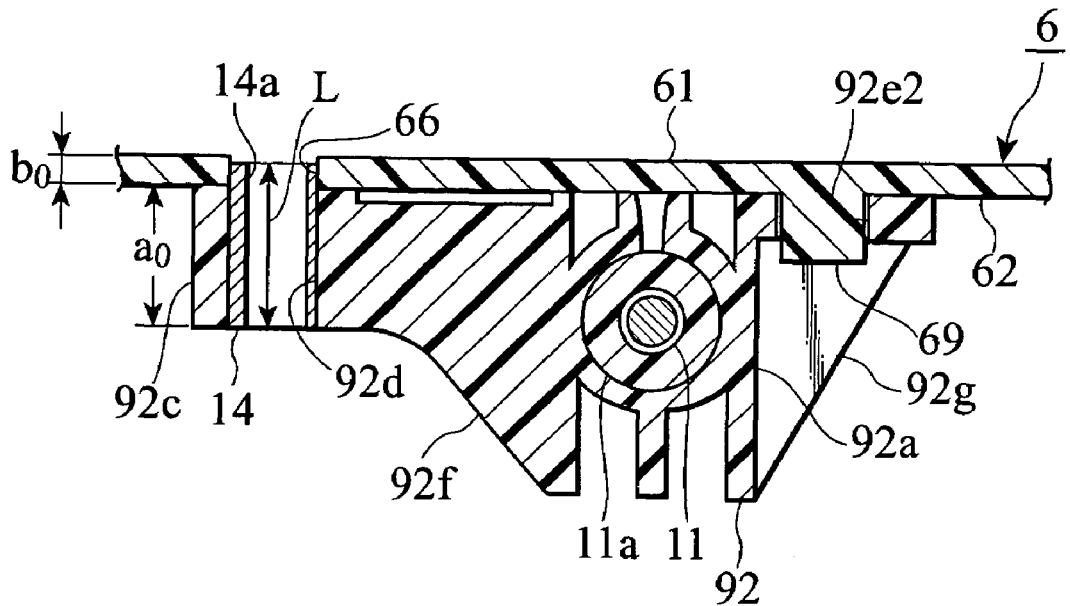
Figure 8B:
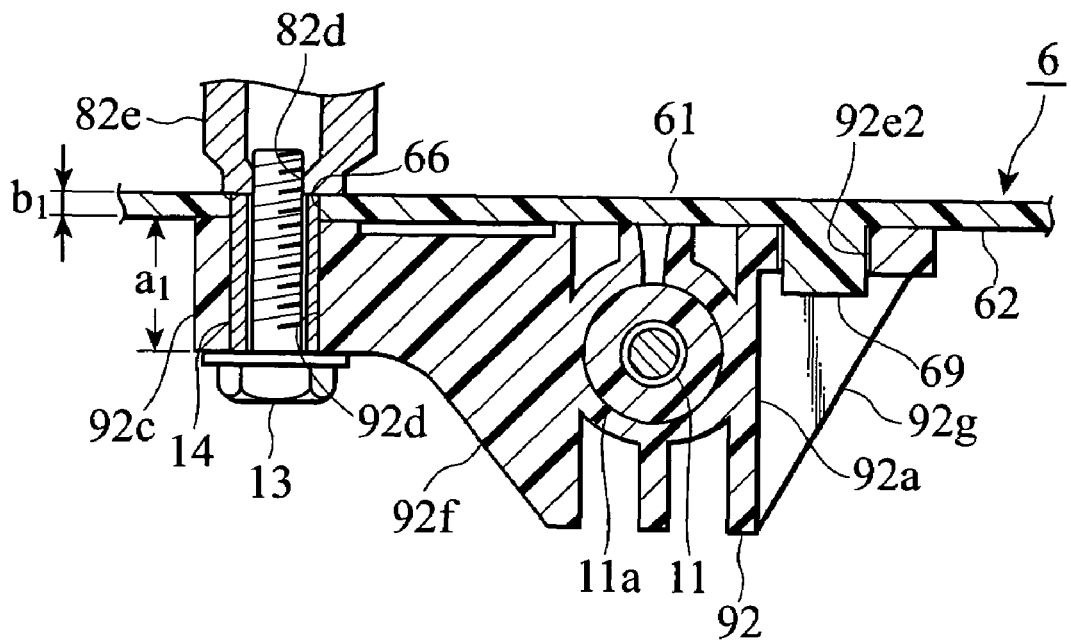

As shown in FIGS. 8A and 8B, the metal tubular member 14 having a predetermined length L in an axial direction and having a sufficient strength against a compression force in a longitudinal direction is fitted or pressure inserted to the mounting hole 92d provided in each of the fixing portions 92c of the drum case 92. The length of the tubular member 14 is set to be longer than a thickness $a_0$ of the fixed portion 92c in the drum case 92 and slightly shorter than a sum of the thickness $a_0$ and a thickness $b_0$ of the module base 6, in a state before the bolt 13 is fastened, as shown in FIG. 8A. In other words, a relation $a_0 < L$ and $a_0 + b_0 > L$ is satisfied. Further, an outer diameter of the tubular member 14 is set to be equal to an inner diameter of the mounting hole 66 of the module base 6 or slightly smaller than the inner diameter. Accordingly, the tubular member 14 protrudes out toward the module base 6 from the mounting hole 92d in a state in which the tubular member 14 is pressure inserted to the mounting hole 92d of the drum case 92, and the protruded protruding portion is fitted to the mounting hole 66 of the module base 6.

In the drum case 92, as mentioned above, the upper and lower holes $92e_1$ and $92e_2$ provided in the rear side (another side portion) of the upper and lower cable insertion portions 92a and 92a are fitted to the upper and lower protruding portions 69 and 69 of the module base 6, and as shown in FIGS. 7 and 8B, a protruding portion 14a of each of the tubular members 14 pressure fitted to the mounting hole 92d of the drum case 92 is fitted to each of the mounting holes 66 of the module base 6. Accordingly, the drum case 92 is securely positioned with respect to the module base 6 on the basis of the fitting between the protruding end of the tubular member 14 and the mounting hole 66 of the module base 6, in addition to the fitting between the hole $92e_1$ ($92e_2$) and the protruding portion 69.

As shown in FIG. 8B, in a state in which the protruding portion 14a of the tubular member 14 is fitted to each of the mounting holes 66 of the module base 6, the bolt 13 is inserted to the tubular member 14 from one end side thereof (the side of another side surface 62 of the module base 6), and is screwed and fastened into the female thread portion 82d provided in the gear case 82 fixed to the side of one side surface 61 of the module base 6. Accordingly, after the periphery of the mounting hole 92d in the fixed portion 92c of the synthetic resin drum case 92 and the periphery of the mounting hole 66 in the module base 6 are compressed in a thickness direction at an amount at which the length L of the tubular member 14 is set to be shorter than the thickness $a_0 + b_0$, one end of the tubular member 14 is brought into contact with a head portion of the bolt 13, and another end thereof is brought into contact with the end surface of the fixed portion 82e forming the female thread means having the female thread portion 82d in the metal gear case 82. The module base 6 and the drum case 92 are extremely slightly compressed on the basis of the fastening of the bolt 13, and a total length thereof is shortened to $b_1$ and $a_1$ respectively. In the state shown in FIG. 8B, a relation $L = a_1 + b_1$ is satisfied. Further, since the tubular member 14 is made from metal, the drum case 92 and the module base 6 are prevented from being compressed further from this state. Accordingly, the drum case 92 can be securely fixed to the module base 6 without deforming the fastened portion between the synthetic resin drum case 92 and module base 6 more than necessary. Further, since the metal tubular member 14 is provided, the fastening force of the bolt 13 is not lowered on the basis of the influence of the heat shrinkage or the like after fastening the bolt 13.

In this case, the female thread means may be separately formed from the gear case 82 without being provided in the gear case 82, or may be constituted by the general nut.

In a state in which the drum case 92 is fixed to the side of another side surface 62 of the module base 6, since the front side (one side portion) near the upper and lower cable insertion portions 92a and 92a in the drum case 92 is fixed to the module base 6 on the basis of the bolts 13 and 13 forming the engagement means, and the rear side (another side portion) is fixed to the module base 6 on the basis of the fitting between the hole $92e_1$ ($92e_2$) forming the engagement means and the protruding portion 69, in other words, both side portions near the cable insertion portion 92a are fixed to the module base 6 by the engagement means, even in the case that a great load is applied to the cable insertion portion 92a, it is possible to securely prevent the cable insertion portion 92a from being deformed, and it is possible to intend an improvement in the strength.

Further, a reinforcing portion 92f which is made thicker than the other regions for reinforcing the front portion (the side portion) of the upper and lower cable insertion portions 92a and 92a is provided, as shown mainly in FIG. 8B, in a region between the fixed portion 92c provided in the front side (one side portion) near the upper and lower cable insertion portions 92a and 92a in three fixed portions 92c of the drum case 92 and the cable insertion portions 92a and 92a.

Further, a plurality of reinforcing pieces 92g for reinforcing the rear portions of the cable insertion portions 92a and 92a are continuously provided in the rear portions (the side portions) of the upper and lower cable insertion portions 92a and 92*a*. The reinforcing pieces 92*g* are provided in the upper and lower sides of the respective holes 92*e*$_1$ and 92*e*$_2$. Accordingly, the front portions and the rear portions (both side portions) of the cable insertion portions 92*a* and 92*a* are reinforced, and it is possible to securely prevent the cable insertion portions 92*a* and 92*a* from being deformed on the basis of the minimum material.

In addition, to enhance the strength of the module base 6, the upper and lower engage holes 92*e*$_1$ and 92*e*$_2$ may be comprised of a blind hole into which the protruding portion 69 can not penetrates through.

What is claimed is:

1. A mounting structure of a power window apparatus mounted on a panel constituting a part of a door, the power window apparatus including a drive unit, a driven unit connected to the drive unit, the driven unit having a rotating drum around which a cable connected to a window panel is wound so as to be wound up and delivered, and a drum case which receives the rotating drum; the mounting structure of the power window apparatus, comprising:

a drum receiving portion included in the drum case, the drum receiving portion receiving the rotating drum;

a first mounting hole in the drum case through which a bolt is inserted, the first mounting hole located in a periphery of the drum receiving portion;

a second mounting hole in the panel constituting the part of the door through which the bolt inserted through the first hole is inserted;

a first engagement portion provided in a first face of the panel constituting the part of the door, a second engagement portion provided in the drum case, the second engagement portion engaging with the first engagement portion and being located in the periphery of the drum receiving portion; and a cable insertion portion through which the cable is inserted, the cable insertion portion integrally formed with the drum case and formed into a tubular shape extending from a side of the drum receiving portion in an insertion direction of the cable;

wherein the first mounting hole and the second engagement portion are positioned so as to interpose both sides of the cable insertion portion therebetween to prevent the cable insertion portion from being deformed, and wherein the drum case is arranged to the first face, and the drive unit is arranged in a second face of the panel constituting the part of the door, which is defined as a back face of the first face.

2. The mounting structure of the power window apparatus according to claim 1, wherein the second engagement portion is constituted by a hole, and the first engagement portion is constituted by a protruding portion capable to be fitted to the hole.

3. The mounting structure of the power window apparatus according to claim 1, wherein the panel is made of synthetic resin, and the first engagement portion is integrally formed in the first face of the panel.

4. The mounting structure of the power window apparatus according to claim 1, wherein the drum case has a fixed portion including the first mounting hole, the fixed portion being fixed to the panel by the bolt.

5. The mounting structure of the power window apparatus according to claim 1, wherein a reinforcing portion for the cable insertion portion is provided between the bolt and the cable insertion portion.

* * * * *